(No Model.) 3 Sheets—Sheet 1.
J. W. SUTTON.
PROCESS OF AND APPARATUS FOR EXTRACTION OF GOLD OR SILVER FROM ORES.
No. 521,898. Patented June 26, 1894.
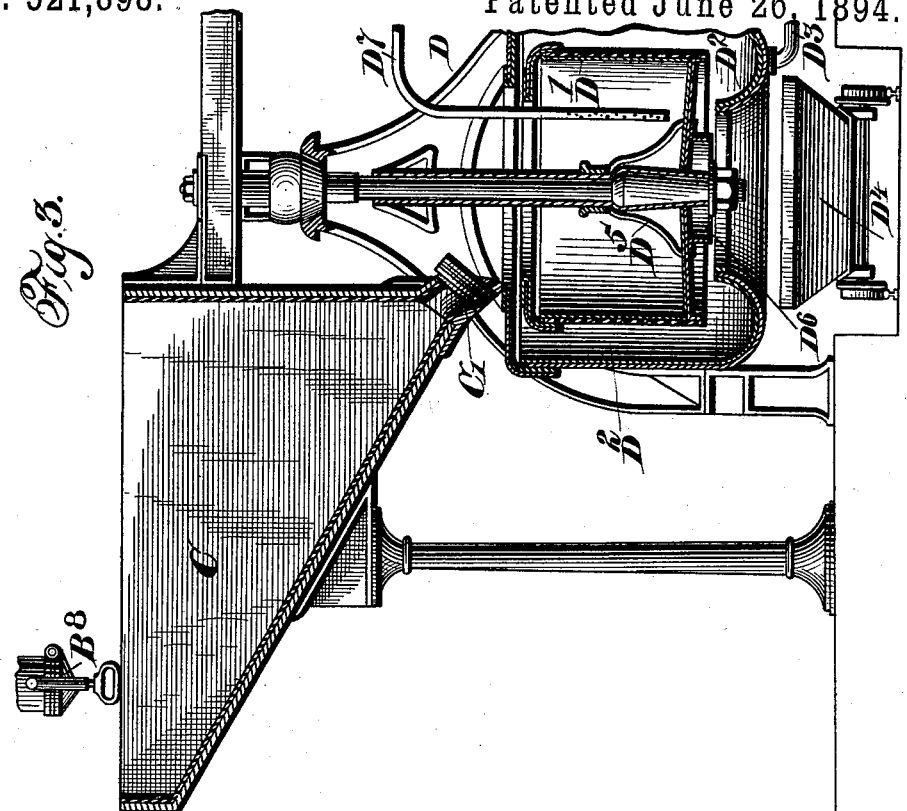
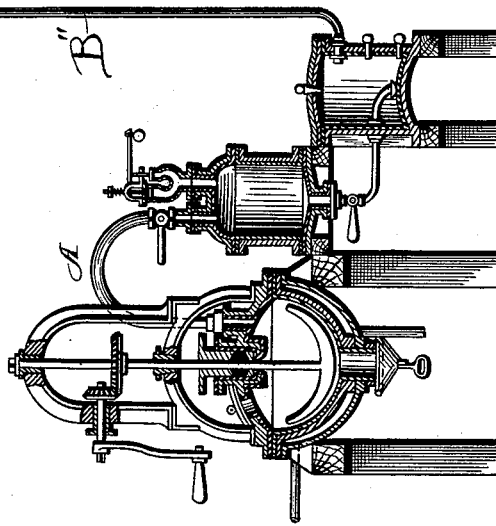
Witnesses:
H. G. Dieterich
C. W. Sommers.
Inventor:
Joseph W. Sutton,
by Henry Orth
Atty.
THE NATIONAL LITHOGRAPHING COMPANY,
WASHINGTON, D. C.

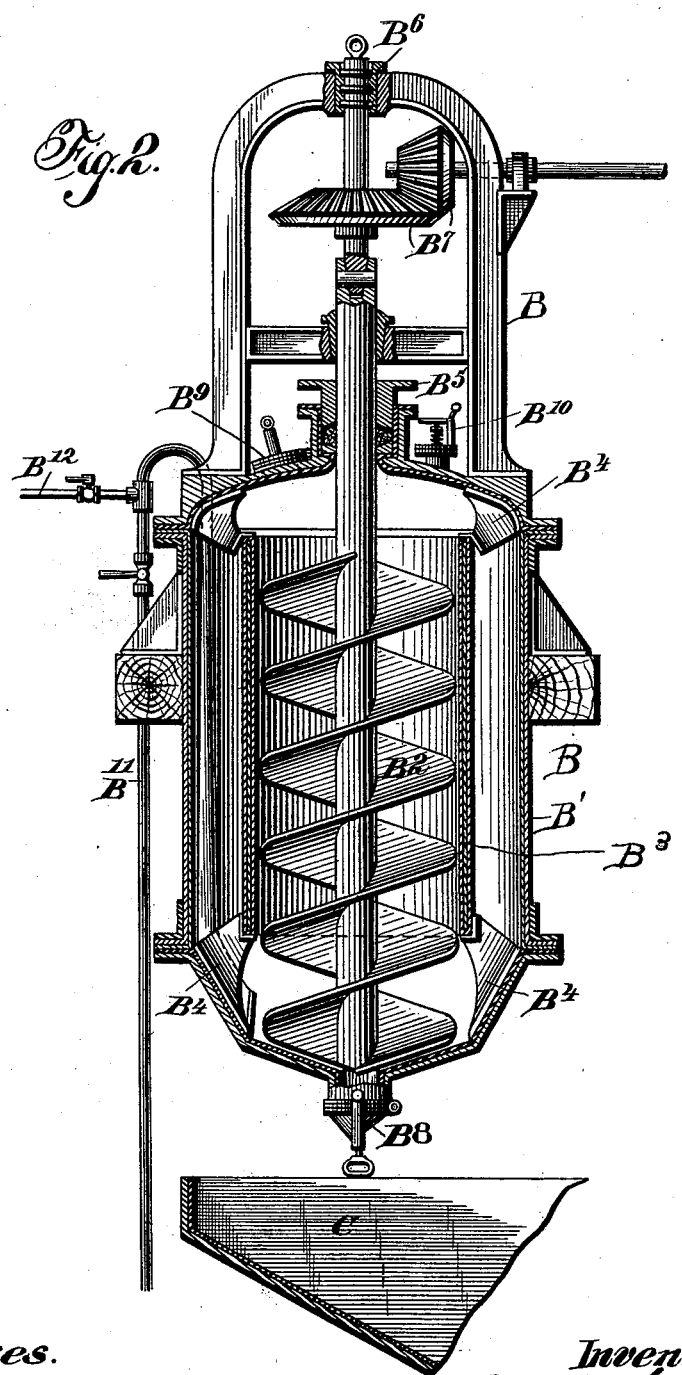

(No Model.) 3 Sheets—Sheet 3.
J. W. SUTTON.
PROCESS OF AND APPARATUS FOR EXTRACTION OF GOLD OR SILVER FROM ORES.
No. 521,898. Patented June 26, 1894.
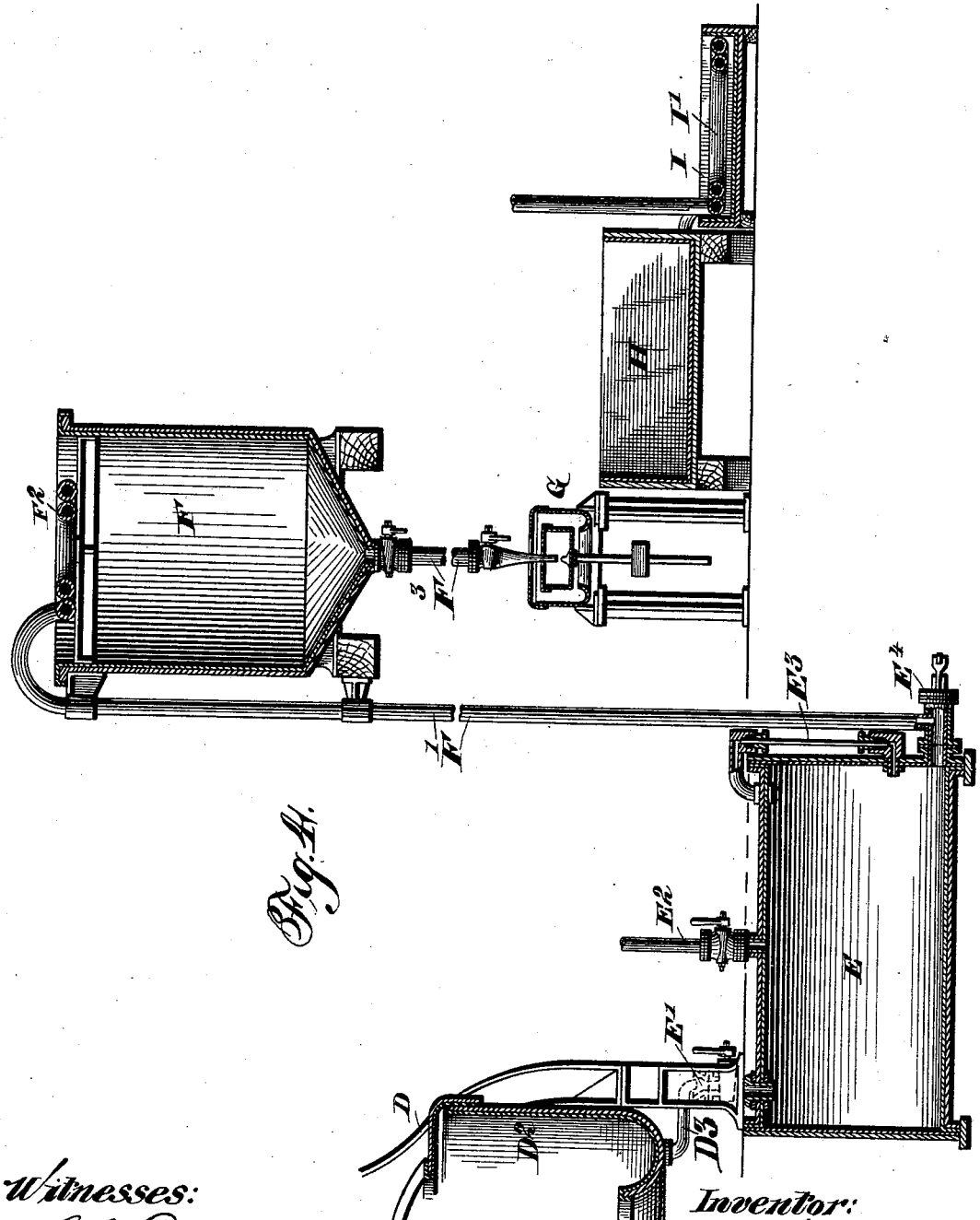
Witnesses:
H. S. Dieterich
B. W. Sommers
Inventor:
Joseph W. Sutton,
by [signature]
Atty.

UNITED STATES PATENT OFFICE.

JOSEPH WILLIAM SUTTON, OF CHELMER, QUEENSLAND.

PROCESS OF AND APPARATUS FOR EXTRACTION OF GOLD OR SILVER FROM ORES.

SPECIFICATION forming part of Letters Patent No. 521,898, dated June 26, 1894.

Application filed October 6, 1892. Serial No. 448,066. (No model.)

*To all whom it may concern:*

Be it known that I, JOSEPH WILLIAM SUTTON, a subject of the Queen of Great Britain and Ireland, and a resident of Chelmer, in the county of Stanley and Colony of Queensland, have invented certain new and useful improvements in the wet process for the extraction of gold or silver, or both, from pulverized ores or other finely-divided material and in apparatus therefor, of which the following is a specification.

This invention relates to improvements in the wet process or method of extracting gold or silver or both by chlorine from pulverized ores or other finely divided material, and to apparatus therefor.

The objects of these improvements are, first: to effect a thorough and constant circulation of the pulverized ore in the chlorinator, thus lessening the time occupied in chlorinating; secondly: to separate and leach out the gold or silver solutions from the chlorinated ore more rapidly, effectually, and economically than has hitherto been done; thirdly: to shorten the time taken in filtering the gold or silver precipitates, and fourthly: to evaporate all the surplus spent liquid, so as to retain any gold or silver still left.

According to my invention the pulverized ore or other finely divided material is placed in a chlorinator consisting of a closed chamber, preferably cylindrical, within which is a screw conveyer provided with an open-ended cylindrical casing. On the screw conveyer being revolved at a moderate speed the ore is carried up to the top of the chamber and falls into the space between the casing of conveyer and the side of the chlorinating chamber, so that the ore is in constant motion while the screw is being revolved. The necessary chlorine may be obtained by adding bleaching powder, sulphuric acid and water to the ore in the chlorinator as is well known; but I prefer to provide a chlorine generator of known construction with connection to the chlorinator. When the chlorination of the gold or gold and silver is complete, the contents of the chlorinator are discharged into a receiver, from which they are drawn in required quantities into a hydro-extractor, the basket of which is revolved at a high rate of speed. By this means the solid material is retained in the basket of the hydro-extractor, and is there thoroughly leached or washed by a spray of water until the gold solution is washed out into the outer cylinder of the hydro-extractor. If it is not desired to treat the ore for silver, the spent material is then discharged into a truck for conveyance to waste heap, and a fresh charge run in from the receiver.

The solution containing the gold is conveyed to a tank, from which it is raised to the precipitating vat—or it may be conveyed directly into the precipitating vat—where the gold is precipitated preferably by sulphate of iron. The precipitate is then run into a small hydro-extractor where it is separated from the liquid. This liquid is discharged into a tank, from which it may be pumped back to the chlorinator for a fresh charge. The surplus liquid is passed into an evaporating tank, thus insuring the retention of any gold still left. When there is sufficient silver in the ore to pay treatment, after the solution containing the gold has been discharged from the hydro-extractor, the remaining solid material is leached with a solution of hyposulphite of sodium, or it is first transferred to a vat and digested with hyposulphite of sodium, and then placed in a hydro-extractor and leached with a spray of water, the operation being continued in separate apparatus, and similarly to that herein described for the recovery of gold, with the exception that in the precipitating vat a precipitate for silver is used instead of one for gold.

In order that the apparatus by which the process is carried into effect may be the better understood, I will now proceed to describe the same by reference to the accompanying drawings, in which—

Figure 1 shows the chlorine generator; Fig. 2 the chlorinator; Fig. 3 the amalgamator, and Fig. 4 the receiver for the chloride solution, the precipitating vat, the pump for elevating the chloride solution to said vat, the receiver for the spent liquor and the evaporator, respectively.

A is a chlorine generator which may be of known construction.

B is a chlorinator consisting of a cylinder of iron B', and lined with lead.

$B^2$ is screw conveyer covered with lead or porcelain and provided with an open-ended cylindrical casing $B^3$, suitably supported on brackets $B^4$.

$B^5$ is packing gland for spindle of screw conveyer.

$B^6$ is thrust journal for supporting screw conveyer.

$B^7$ is gearing connected with motive power for driving screw.

$B^8$ is discharge door; $B^9$ charging door; $B^{10}$ relief valve; $B^{11}$ conduit pipe from chlorine generator, entering at top and running to bottom of chlorinator.

$B^{12}$ is steam pipe for clearing chlorine pipe $B^{11}$ in case of getting stopped with ore.

C is receiver for chlorinated ore, and which may be covered and provided with a ventilator for carrying off the fumes of chlorine.

$C'$ is slide door for drawing off the chlorinated ore.

D is a hydro-extractor of known construction.

$D'$ is basket constructed of iron, with lead lining, and perforated and provided on its inner side with asbestos cloth or other filtering material.

$D^2$ is outer casing, also lead lined.

$D^3$ is exit pipe for solution containing the gold.

$D^4$ is truck for conveyance of waste material.

$D^5$ is sliding cover for discharge opening $D^6$.

$D^7$ is perforated pipe for leaching ore in basket.

E is tank for the reception of the chloride of gold solution.

$E'$ is cock with receiving funnel.

$E^2$ is steam pipe; $E^3$ gage glass; $E^4$ plug-hole for cleaning out tank when necessary.

F is precipitating vat; $F'$ pipe from tank E; $F^2$ coil of pipe $F'$ perforated underneath; $F^3$ pipe for conveying precipitate and liquid to a small hydro-extractor G, similar to hydro-extractor D.

H is tank for spent liquid; I tank for evaporating surplus liquid by means of steam coil $I'$.

The operation of the process for the extraction of gold or gold and silver from pulverized ores or other finely divided material by means of my apparatus is as follows:— The pulverized ore or other finely divided material having been roasted if necessary, is either mixed with water to a mortar-like consistency and run into the chlorinator through charging door $B^9$, or the water may be put into the chlorinator, and motion given to the screw while the dry ore is admitted through the charging door, thus making the chlorinator perform its own mixing. When the chlorinator is nearly full the charging door $B^9$ is screwed down, chlorine turned on from generator A, and relief valve $B^{10}$ opened. The screw conveyer $B^2$ is kept revolving, thus causing the ore to be in constant motion until the whole of the gold and silver is converted into chlorides, which time will depend on the nature and quality of the ore, but for ores containing gold and silver in a fine state of division, a charge of about five tons can be chlorinated in about two hours. When the ore is sufficiently chlorinated it is discharged through door $B^8$ into receiver C, from which it is drawn off in suitable charges into the hydro-extractor D. The basket $D'$ being revolved at a high rate of speed, the solution containing the gold is expelled from the ore through the filtering material and perforated sides of basket. The ore in the basket is then leached or washed with clean water from perforated pipe $D^7$, and I find that about half-a-gallon of water is sufficient to leach or wash out all the solution containing the gold from a charge of about one-fifth of a ton in from five to seven minutes.

If it is not desired to treat the ore for the recovery of the silver as hereinafter described, sliding cover $D^5$ is raised and the spent ore thrown out through discharge door $D^6$ into truck $D^4$ for conveyance to waste heap and a fresh charge of chlorinated ore drawn into basket. The solution containing the chloride of gold having been retained by the outer casing $D^2$ is discharged by pipe $D^3$ into receiver E. When it has been ascertained by means of gage glass $E^3$ that receiver E is full, cock $E'$ is closed and steam admitted at $E^2$ and the whole of the solution forced up through pipe $F'$ and distributed by perforated coil $F^2$ over the surface of precipitant in tank F. The gold having been precipitated preferably by sulphate of iron, is discharged together with the liquid by pipe $F^3$ into filtering hydro-extractor G, where the precipitate is retained in the basket from which it is scooped out from time to time and the gold melted in the usual way. The liquid expelled from the precipitate in the centrifugal or hydro extractor G flows into a waste lye tank H, and so much of said liquid as may be necessary can be used for the chlorination of fresh batches of ore. The remaining liquid is caused to flow into an evaporator I where it is evaporated by means of a steam coil $I'$, care being taken not to raise the temperature of the water over 212° Fahrenheit, and if desired the whole of the waste lye or liquor from hydro extractor G can be carried to evaporator I. This insures against any loss of gold which might occur through imperfect precipitating or filtering. When charcoal is the precipitant and filtering medium used, the hydro-extractor G is dispensed with, the liquid passing through the charcoal being conveyed direct to tank H. After all of the solution containing the chloride of gold that can be expelled from the solid matter by centrifugal action in centrifugal or hydro extractor D has been expelled, a leaching agent, as water, is admitted to the basket, and any remaining chloride solution washed or leached out, the liquid being conveyed directly to the evaporator I and evaporated, for the purposes above set forth.

When it is desired to extract the silver from the ore, after the solution containing the gold has been discharged from the hydro-extractor the remaining ore in the basket is washed or leached with a solution of sodium hyposulphite through pipe similar to $D^7$ to dissolve the chloride of silver, or the ore may be first transferred to a vat (not shown) and there digested with sodium hypo-sulphite solution. After being properly digested it is placed in hydro-extractor and there washed or leached with a spray of water from pipe $D^7$. The solution containing the silver is run into a separate receiver and the operation continued in separate apparatus similarly to that herein described for the recovery of gold, a precipitate for the silver being used in the precipitating vat instead of one for gold.

When the ore contains a large proportion of silver and little or no gold, it is not chlorinated in the manner previously described, but is roasted with chloride of sodium to obtain chloride of silver. The material is then treated in a hydro-extractor such as D, and the operation continued as hereinbefore described.

It will be understood that all parts of the apparatus exposed to the action of chlorine are either lined with lead porcelain or other known chlorine-resisting material.

Having now described my invention, what I claim as new, and desire to secure by Letters Patent, is—

1. In the wet process for the extraction of precious metals from their ores, the improvement which consists in pulping the ore, chlorinating the same while being agitated, leaching the chlorinated pulp, separating the precious metal from the liquor by precipitation and evaporating to dryness the remaining liquor, for the purposes set forth.

2. In the wet process for the extraction of precious metals from their ores, the improvement which consists in pulping the ore, chlorinating the same while being agitated, leaching the chlorinated pulp, separating the precious metal from the liquor by precipitation, utilizing a portion of the spent liquor for pulping a fresh batch of ore, and evaporating the surplus liquor, for the purposes set forth.

3. An apparatus for extracting precious metals from their ores, comprising a chlorine generator, a chlorinator connected therewith, a centrifugal connected by feed chute with the chlorinator, means for supplying a leaching agent to the basket of the centrifugal, a receiving tank, a connection between the tank and shell of the centrifugal for conveying the expelled liquid from said shell to said tank, a precipitating tank, means for conveying the liquid from the receiving to the precipitating tank, a second centrifugal connected with the precipitating tank, a receiving tank H connected with the shell of the last named centrifugal, and an evaporator connected with said receiving tank H, for the purposes set forth.

4. The combination with the chlorinator, the centrifugal or hydro extractor D and the precipitating tank F provided in its upper portion with a perforated pipe and having a conical bottom, of the tank E, means for conveying the liquid from the shell of the centrifugal D to said tank, a pipe connected with the tank near its bottom and with the perforated pipe of the precipitating tank, and a steam conduit opening into the tank at the upper portion thereof, for the purposes set forth.

In witness whereof I have hereunto set my hand in presence of two witnesses.

JOSEPH WILLIAM SUTTON.

Witnesses:
ALEXANDER SMITH LANG,
*Accountant, 21 Queen St.*
CHARLES EDWARD GRAHAM,
21 *Queen Street, Brisbane, Patent Agent.*